2,920,060

TINALKYLSILALKYL ORGANOSILICON COMPOUNDS

Robert L. Merker, Pittsburgh, Pa., assignor to Dow Corning Corporation, Midland, Mich., a corporation of Michigan No Drawing. Application August 28, 1958
Serial No. 757,658

12 Claims. (Cl. 260—46.5)

The present invention relates to certain tinalkylsilalkyl silanes, to a process for their preparation, and to polymeric siloxanes derivable from said silanes.

The monomeric products of this invention are of the formula $$[X_3Si(CH_2)_yR_2SiCH_2(CHZ)_n(CH_2)_m]_{4-x-q}$$
$$SNR'_x[(CH_2)_m(CHZ)_nCH_2SiR_2H]_q$$

where each X is selected from the group consisting of monovalent hydrocarbon radicals free of aliphatic unsaturation, alkoxy radicals, chlorine atoms, and bromine atoms, each R is a monovalent hydrocarbon radical free of aliphatic unsaturation, each R' is selected from the group consisting of alkyl and phenyl radicals, Z is selected from the group consisting of hydrogen and the methyl radical, $x$ is an integer of from 1 to 3 inclusive, $q$ is an integer of from 0 to 2 inclusive, the sum of $x+q$ is an integer of from 1 to 3 inclusive, $y$ is an integer of at least 2, $m$ is an integer or from 0 to 1 inclusive, and $n$ is an integer of from 0 to 1 and is 1 only when $m$ is 1.

Since $n$ in the above definition can be 1 only when $m$ is 1, it will be seen that the alkylene groups which can link the silicon atoms to the tin atoms will be either

—CH$_2$—, —CH$_2$CH$_2$—, —(CH$_2$)$_3$— or —CH$_2$CH(CH$_3$)CH$_2$— groups.

The above silanes can be produced by the process which comprises reacting (1) a compound of the formula $X_3Si(CH_2)_zCH=CH_2$ where each X is as above defined and $z$ is 0 or any positive integer, with (2) a compound of the formula $$[HR_2SiCH_2(CHZ)_n(CH_2)_m]_{4-x}SnR'_x$$

where R, R', Z, m, n and x are as above defined, by contacting (1) with (2) in a liquid phase in the presence of chloroplatinic acid. Preferably $z$ in the above formula is from 0 to 6 inclusive, and most preferably it is 0 or 1. It will be seen that if sufficient reactant (1) is present to react with all of the silicon-bonded H atoms in (2), in the product formula $q$ will be 0. If $x$ is less than 3 and less than an equivalent amount of (1) is employed, products where $q$ is 1 or 2 can be obtained.

This invention is also concerned with the siloxanes which can be derived by the hydrolysis of the above-defined monomeric silane products in which $q$ is 0 and in which no more than two of the X substituents are monovalent hydrocarbon radicals. These siloxanes can be homopolymers in which all of the siloxane units are the same, or copolymers containing different siloxane units derived from a mixture of two or more of the defined hydrolyzable monomeric silane products, or copolymers containing one or more of the aforesaid types of siloxane units along with one or more types of "conventional" organosiloxane units of the formula $$H_sR''_tSiO_{\frac{4-s-t}{2}}$$

where each R" is a monovalent hydrocarbon or halogenated monovalent hydrocarbon radical, $t$ is an integer of from 1 to 3 inclusive, $s$ is from 0 to 1 inclusive, and $s+t$ is from 1 to 3 inclusive.

Thus the polymeric and copolymeric products of this invention include organotin siloxanes consisting essentially of polymeric units of the formula $$[O_{\frac{3-p}{2}}R_pSi(CH_2)_yR_2SiCH_2(CHZ)_n(CH_2)_m]_{4-x}SnR'_x$$

where R, R', Z, x, m, n and y are as above defined and $p$ is an integer of from 0 to 2 inclusive. The modified copolymeric siloxanes of this invention are then those which consist essentially of polymeric units of the above-defined type and polymeric units of the type $$H_sR''_tSiO_{\frac{4-s-t}{2}}$$

as above defined. In the latter copolymer, there is preferably at least 1 molar percent of the former units.

The reactants of the formula $X_3Si(CH_2)_zCH=CH_2$ as above defined are well-known materials. They can be prepared by, e.g. reacting $X_3SiCl$ with a Grignard reagent prepared from $Br(CH_2)_zCH=CH_2$ or the corresponding chloride. Alternatively, $CH_2=CHSiCl_3$ or $CH_2=CHSiBr_3$ can be alkoxylated with an alcohol to replace some or all of the halogen atoms or Grignardized with RMgCl to introduce R groups. As has been noted previously, it is most preferred that $z$ be 0 or 1, thus the corresponding value of $y$ in the product formula preferably will be 2 or 3. Each X can be any monovalent hydrocarbon radical free of aliphatic unsaturation or any alkoxy radical, as well as a chlorine or bromine atom. Suitable hydrocarbon radicals include alkyl radicals such as methyl, ethyl, isopropyl and octadecyl; aryl radicals such as phenyl, xenyl and naphthyl; aralkyl radicals such as benzyl; alkaryl radicals such as tolyl and xylyl; and cycloaliphatic radicals such as cyclohexyl. Methyl, ethyl and phenyl are the most preferred of such radicals. When X is an alkoxy radical, it can be, e.g., methoxy, ethoxy, isobutoxy and the like, and although any alkoxy radical is suitable here, the most preferred radicals are those of from 1 to 4 inclusive carbon atoms. The X radicals can, of course, be the same or different radicals attached to any particular silicon atom.

The reactant of the formula $$[HR_2SiCH_2(CHZ)_n(CH_2)_m]_{4-x}SnR'_x$$

can be prepared by the process described in detail in my copending application filed concurrently herewith entitled "Silalkyltin Compounds." In brief, the said process comprises reacting the Grignard reagent $$HR_2SiCH_2(CHZ)_n(CH_2)_mMgCl$$

or the corresponding bromide with the appropriate organotin halide, e.g. $R'_xSnCl_{4-x}$ and the corresponding bromides.

In the above Grignard reagent, R can be any monovalent hydrocarbon radical free of aliphatic unsaturation, suitable examples of which are the same as those examples given above for those X radicals which were monovalent hydrocarbon radicals. The preferred R radicals are methyl, ethyl and phenyl radicals, and the R radicals can be the same or different radicals attached to any particular silicon atom.

The Grignard reagents referred to above are easily prepared in excellent yield by the conventional techniques for the preparation of Grignard reagents. Thus a compound of the formula $HR_2Si(CHZ)_n(CH_2)_mCl$ or the corresponding bromide is ordinarily diluted with diethylether or tetrahydrofuran and intimately contacted with magnesium shavings. The necessary haloalkyldiorganosilane can be prepared by the reduction of the corresponding haloalkyldiorganohalosilane, e. g.

$$ClCH_2(CHZ)_n(CH_2)_mSiR_2Cl$$

with LiAlH$_4$. This reduction can be carried out by merely contacting a solution of LiAlH$_4$ in ether or tetrahydrofuran with the defined haloalkyldiorganohalosilane.

The silanes necessary for the preparation of the above-defined Grignard reagent are known compounds. They can be produced, for example, by halogenating CH$_3$SiCl$_3$ and then replacing two of the silicon-bonded halogen atoms by the conventional Grignard reaction with a RMgCl compound, or, when longer alkylene chains are desired, by reacting allyl chloride, methallyl chloride, or vinyl chloride with a compound of the formula R$_2$HSiCl in the presence of a catalyst such as chloroplatinic acid to produce the corresponding adduct. If desired the latter well-known addition reaction can be modified by employing RHSiCl$_2$ or HSiCl$_3$ in place of the R$_2$HSiCl, in which case the necessary additional R radical or radicals can then be attached by Grignardizing all but one of the silicon-bonded chlorine atoms.

The necessary organotin halide reactants are of course well-known materials. Each R' radical can be any alkyl radical as well as a phenyl radical, and the radicals present on a particular Sn atom can be the same or different. Preferably these alkyl radicals contain no more than 8 carbon atoms, and it is most preferred that they contain from 1 to 4 inclusive carbon atoms in a straight chain. Suitable examples of the tin reactants include MeSnCl$_3$, MeSnBr$_3$, PhSnCl$_3$, Bu$_2$SnCl$_2$, Me$_2$SnCl$_2$, Et$_2$(i-Bu)SnBr, Et$_2$PrSnBr, (i-Pr)$_2$SnCl$_2$, Ph$_2$SnBr$_2$, Me$_3$SnCl, Bu$_3$SnCl, and PhMeSnCl$_2$. The symbols Me, Et, Pr, i-Pr, Bu, and Ph are used above and throughout this specification as representative of methyl, ethyl, propyl, isopropyl, butyl and phenyl radicals respectively.

The addition reaction of this invention between $$X_3Si(CH_2)_2CH=CH_2$$

and $$[HR_2SiCH_2(CHZ)_n(CH_2)_m]_{4-x}SnR'_x$$

may be carried out in the presence of chloroplatinic acid at any temperature which provides liquid phase reaction conditions. For commercially practical results, however, it is preferred to operate at a temperature in the range of from 50° to 200° C. The reaction can be carried out in the presence of inert organic solvents as diluents if desired. The chloroplatinic acid catalyst is effective in mere trace amounts but best results are obtained by employing an amount in the range of from $1 \times 10^{-6}$ to $1 \times 10^{-3}$ mol of catalyst per mol of the unsaturated hydrocarbon substituted silane reactant. Any amount of catalyst in excess of the preferred amount can be employed without detrimental effect, but this only increases the cost of the process without any particular increase in efficiency.

The chloroplatinic acid can be used in its dehydrated form if desired, but this, too, merely increases the cost of the process and the commercially available form of the acid, i.e. the hexahydrate, is preferred. Since such minute amounts of the catalyst are ordinarily employed, it is also preferable for handling purposes to use the catalyst as a solution in any organic solvent in which it is soluble, a preferred solvent being isopropanol.

As has been noted previously the siloxanes of this invention are derived from the corresponding monomeric silanes in which at least some of the X radicals are hydrolyzable radicals, i.e. alkoxy radicals or chlorine or bromine atoms. The siloxanes are obtained by hydrolyzing the aforesaid silanes by any of the conventional techniques for the hydrolysis of hydrolyzable organosilanes. Likewise, when copolymers of the defined siloxane units with "conventional" siloxane units are desired, the aforesaid monomeric silanes of this invention are cohydrolyzed with H$_s$R"$_t$SiCl$_{4-s-t}$ or the alkoxy derivatives thereof, where R", $s$, and $t$ are as previously defined.

The H$_s$R"$_t$SiCl$_{4-s-t}$ compounds and alkoxy derivatives thereof are well known. R" can be any monovalent hydrocarbon radical or any halogenated derivatives of such radicals. Suitable examples include all of the hydrocarbon radicals illustrated above in regard to the X radicals, as well as alkenyl and alkynyl radicals such as vinyl, allyl, cyclohexenyl, and propynyl; and halogenated derivatives of any of the illustrative radicals, e.g. bromophenyl, dichlorophenyl, chloroxenyl, tetrabromoxenyl, tetrafluoroethyl, α,α,α-trifluorotolyl, chlorovinyl, and 1,1,1-trifluoropropyl radicals. Preferred R" radicals are methyl, ethyl, phenyl, and halophenyl. Copolymers can also be prepared by copolymerizing a polymer containing only the tinalkylsilalkyl siloxane units with a polymer or copolymer containing only $$\frac{R''_tSiO_{4-t}}{2}$$

units, using conventional alkaline copolymerization agents for the copolymerization of organosiloxanes, such as NaOH or KOH. The latter are ordinarily employed in an amount sufficient to provide 1 Na or K atom for every 10 to 10,000 Si atoms in the combined siloxanes. Techniques for the latter type of copolymerization are well known. Generally the siloxanes and the alkaline catalysts are merely intimately mixed at temperatures ranging from about 140° to 170° C.

The polymers and copolymers of this invention can be linear, cyclic, or cross-linked in structure, and vary from fluids to gums to resins in their physical nature. As with most organosiloxanes, these products can contain small amounts of uncondensed silicon-bonded hydroxy groups. In depicting the siloxane units present in these products, the formulas used are those which are conventional in the organosiloxane art. For example, the unit R$_2$SiO represents the structure $$\begin{array}{c} R_2SiO- \\ | \\ O \end{array}$$

and R$_3$SiO$_{.5}$ represents R$_3$SiO—.

The products of this invention are useful as lubricating oils and hydraulic fluids, and as additives to conventional organosiloxane fluids to improve their lubricating properties. The major utility of those monomers of this invention which contain hydrolyzable groups attached to silicon lies in their use as intermediates for the preparation of siloxane polymers and copolymers. Those products of this invention which contain butyl groups attached to tin exhibit antimicrobic properties in respect to gram positive organisms, and have antifungal and anti-mildew properties as well. Thus such products can be used to treat materials such as textiles and leather to provide mildew resistance.

The following examples are merely illustrative and are not intended to limit the invention which is properly delineated in the appended claims.

*Example 1*

Two drops of 0.1 M chloroplatinic acid in isopropanol were added to 50 g. (0.1375 mol) Bu$_3$SnCH$_2$SiHMe$_2$, then 16.6 g. (0.1375 mol) CH$_2$=CHSiMe$_2$Cl was added over a two-hour period while the reaction mixture was maintained at reflux temperature, which rose from 90° to 150° C. during the addition. Fractional distillation of the reaction mass yielded the compound $$ClMe_2SiCH_2CH_2(Me)_2SiCH_2SnBu_3.$$

B.P. 180° C. at 30 mm. Hg, $n_D^{25}$ 1.4836, $d_4^{25}$ 1.066. In like manner, the reaction of CH$_2$=CHSiCl$_3$, $$CH_2=CHSiMeCl_2$$

or CH$_2$=CHSiMe$_2$Br produces the corresponding Cl$_3$Si—, $Cl_2MeSi-$, or $BrMe_2Si-$ substituted derivatives, and the reaction of $CH_2=CHSiMe_2OEt$ produces the $$EtOME_2Si-$$

substituted derivative. Likewise, the reaction of $$Me_3Sn(CH_2)_3SiHPhMe$$

with $CH_2=CHCH_2SiPhEtCl$ at 150° C. in the presence of chloroplatinic acid produces $$ClPhEtSi(CH_2)_3SiPhMe(CH_2)_3SnMe_3,$$

and the reaction of $PhMe_2SnCH_2CHMeCH_2SiHMe_2$ with $CH_2=CHSiMe_2Cl$ in the same manner produces $$ClMe_2SiCH_2CH_2(Me)_2SiCH_2CHMeCH_2SnPhMe_2.$$

Example 2

When $(HMe_2SiCH_2)_2SnBu_2$ and $CH_2=CHSiMe_2Cl$ in a 1:2 molar ratio are reacted in the manner of Example 1, the compound $[ClMe_2SiCH_2CH_2(Me)_2SiCH_2]_2SnBu_2$ is produced. Likewise, the use of a 1:3 ratio and $$(HMe_2SiCH_2)_3SnBu$$

as the tin reactant produces $$[ClMe_2SiCH_2CH_2(Me)_2SiCH_2]_3SnBu.$$

The use of an equimolar ratio of reactants in the latter case yields a product of the formula $$[ClMe_2SiCH_2CH_2(Me)_2SiCH_2]SnBu(CH_2SiMe_2H)_2.$$

Example 3

When any of the monomeric silanes of Examples 1 or 2 are mixed with an amount of water equal to or in excess of the theoretical amount necessary to hydrolyze the functional substituents attached to Si ("functional" substituents being the silicon-bonded Cl, Br, or alkoxy groups), the corresponding siloxanes are produced.

Thus when $ClMe_2SiCH_2CH_2(Me)_2SiCH_2SnBu_3$ is mixed with an excess of water and the hydrolyzate neutralized and dried, the compound $$O[Si(Me)_2CH_2CH_2(Me)_2SiCH_2SnBu_3]_2$$

is produced, $n_D^{25}$ 1.4850, $d_4^{25}$ 1.045. Likewise, the hydrolysis of $$ClMe_2SiCH_2CH_2(Me)_2SiCH_2CHMeCH_2SnPhMe_2$$ produces $$O[Si(Me)_2CH_2CH_2(Me)_2SiCH_2CHMeCH_2SnPhMe_2]_2$$

Example 4

When $Cl_2MeSiCH_2CH_2(Me)_2SiCH_2SnBu_3$ is mixed with an equal weight of toluene, then the mixture hydrolyzed with an excess of water and the hydrolyzate washed free of acid and dried, the resulting polymer consists essentially of units of the formula $$[OSi(Me)CH_2CH_2(Me)_2SiCH_2SnBu_3].$$

This polymer can be either fluid or gummy in consistency, depending upon its molecular size. In like manner, the hydrolysis of $Cl_3SiCH_2CH_2(Me)_2SiCH_2SnBu_3$ leads to the production of a resinous polymer consisting essentially of units of the formula $$[O_{1.5}SiCH_2CH_2(Me)_2SiCH_2SnBu_3].$$

When the two monomers above are mixed and cohydrolyzed, the resulting copolymeric siloxane is a copolymer of both of the above units.

Example 5

The hydrolysis of $$[ClMe_2SiCH_2CH_2(Me)_2SiCH_2]_2SnBu_2$$

in the manner of Example 4 produces a polymer containing the structure $$[O_{.5}Si(Me)_2CH_2CH_2(Me)_2SiCH_2]_2SnBu_2.$$

This can exist in both cyclic and linear forms, and can be either fluid or gummy, depending upon its molecular size. The hydrolysis of $[Cl_2MeSiCH_2CH_2(Me)_2SiCH_2]_2SnBu_2$ in like manner produces a cross-linked resinous polymer containing the units $$[OSiMeCH_2CH_2(Me)_2SiCH_2]_2SnBu_2.$$

Example 6

When equimolar amounts of $$ClMe_2SiCH_2CH_2(Me)_2SiCH_2SnBu_3$$

and $Me_3SiCl$ are cohydrolyzed in the manner of Example 3, the hydrolyzate contains the "disiloxanes" derivable from each monomer as well as the compound $$Me_3SiOSi(Me)_2CH_2CH_2(Me)_2SiCH_2SnBu_3.$$

The use of $PhMe_2SiCl$ or $CH_2=CHSiMe_2Cl$ in place of the $Me_3SiCl$ produces the corresponding $PhMe_2Si-$ or $CH_2=CHMe_2Si-$ substituted products.

Example 7

When a mixture containing the molar percentage of 5% $Me_3SiCl$, 5% $ClMe_2SiCH_2CH_2(Me)_2SiCH_2SnBu_3$, 8% $Cl_2C_6H_3SiCl_3$, and 82% $Me_2SiCl_2$ is cohydrolyzed with an excess of water, the cohydrolyzate washed free of acid and heated at 160° C. in the presence of KOH (1 K per 1,000 Si ratio), a copolymer is produced containing $Me_3SiO_{.5}$, $Cl_2C_6H_3SiO_{1.5}$, $Me_2SiO$, and $$Bu_3SnCH_2Si(Me)_2CH_2CH_2(Me)_2SiO_{.5}$$

units.

Example 8

When a mixture containing the molar percentage of 10% $Me_3SiCl$, 5% $Cl_2MeSiCH_2CH_2(Me)_2SiCH_2SnBu_3$, and 85% $MeHSiCl_2$ is cohydrolyzed with an excess of water and the hydrolyzate washed free of acid, the resulting copolymer consists essentially of $Me_3SiO_{.5}$, $MeHSiO$, and $Bu_3SnCH_2Si(Me)_2CH_2CH_2(Me)SiO$ units.

That which is claimed is:

1. A tinalkylsilalkyl silane of the formula $$[X_3Si(CH_2)_yR_2SiCH_2(CHZ)_n(CH_2)_m]_{4-x-q}SnR'_x$$
$$[(CH_2)_m(CHZ)_nCH_2SiR_2H]_q$$

where each X is selected from the group consisting of monovalent hydrocarbon radicals free of aliphatic unsaturation, alkoxy radicals, chlorine atoms, and bromine atoms, each R is a monovalent hydrocarbon radical free of aliphatic unsaturation, each R' is selected from the group consisting of alkyl and phenyl radicals, Z is selected from the group consisting of hydrogen and the methyl radical, $x$ is an integer of from 1 to 3 inclusive, $q$ is an integer of from 0 to 2 inclusive, the sum of $x + q$ is an integer of from 1 to 3 inclusive, $y$ is an integer of at least 2, $m$ is an integer of from 0 to 1 inclusive, and $n$ is an integer of from 0 to 1 and is 1 only when $m$ is 1.

2. The process which comprises reacting (1) a compound of the formula $X_3Si(CH_2)_zCH=CH_2$ where each X is selected from the group consisting of monovalent hydrocarbon radicals free of aliphatic unsaturation, alkoxy radicals, chlorine atoms and bromine atoms, and $z$ is an integer of from 0 to 1 inclusive, with (2) a compound of the formula $$[HR_2SiCH_2(CHZ)_n(CH_2)_m]_{4-x}SnR'_x$$

where R is a monovalent hydrocarbon radical free of aliphatic unsaturation, R' is selected from the group consisting of alkyl and phenyl radicals, Z is selected from the group consisting of hydrogen and the methyl radical, $m$ is an integer of from 0 to 1 inclusive, $n$ is an integer of from 0 to 1 inclusive and is 1 only when $m$ is 1, and $x$ is an integer of from 1 to 3 inclusive, by contacting (1) with (2) in a liquid phase in the presence of chloroplatinic acid.

3. A compound of the formula $$[ClMe_2SiCH_2CH_2(Me)_2SiCH_2]_2SnR'_2$$

where R' is an alkyl radical of from 1 to 4 carbon atoms and Me represents a methyl radical.

4. A compound of the formula $$ClMe_2SiCH_2CH_2(Me)_2SiCH_2SnR'_3$$

where R' is an alkyl radical of from 1 to 4 carbon atoms inclusive and Me represents a methyl radical.

5. The compound $ClMe_2SiCH_2CH_2(Me)_2SiCH_2SnBu_3$ where Me and Bu represent methyl and butyl radicals respectively.

6. The compound $Cl_2MeSiCH_2CH_2(Me)_2SiCH_2SnBu_3$ where Me and Bu represent methyl and butyl radicals respectively.

7. The compound $Cl_3SiCH_2CH_2(Me)_2SiCH_2SnBu_3$ where Me and Bu represent methyl and butyl radicals respectively.

8. A polymeric organotinsiloxane consisting essentially of polymeric units of the formula $$[O_{\frac{3-p}{2}}R_pSi(CH_2)_yR_2SiCH_2(CHZ)_n(CH_2)_m]_{4-x}SnR'_x$$

where each R is a monovalent hydrocarbon radical free of aliphatic unsaturation, each R' is selected from the group consisting of alkyl and phenyl radicals, Z is selected from the group consisting of hydrogen and the methyl radical, x is an integer of from 1 to 3 inclusive, p is an integer of from 0 to 2 inclusive, m is an integer of from 0 to 1 inclusive, n is an integer of from 0 to 1 inclusive and is 1 only when m is 1, and y is an integer of at least 2.

9. An organotinsiloxane having the formula $$O[Si(Me)_2CH_2CH_2(Me)_2SiCH_2SnBu_3]_2$$

where Me and Bu represent methyl and butyl radicals respectively.

10. An organotinsiloxane in which the polymeric units consist essentially of units of the formula $$[OSi(Me)CH_2CH_2(Me)_2SiCH_2SnBu_3]$$

in which Me and Bu represent methyl and butyl radicals respectively.

11. An organotinsiloxane in which the polymeric units consist essentially of units of the formula $$[O_{1.5}SiCH_2CH_2(Me)_2SiCH_2SnBu_3]$$

where Me and Bu represent methyl and butyl radicals respectively.

12. A copolymeric organotinorganosiloxane in which the polymeric units consist essentially of (1) units of the formula $$[O_{\frac{3-p}{2}}R_pSi(CH_2)_yR_2SiCH_2(CHZ)_n(CH_2)_m]_{4-x}SnR'_x$$

where each R is a monovalent hydrocarbon radical free of aliphatic unsaturation, each R' is selected from the group consisting of alkyl and phenyl radicals, Z is selected from the group consisting of hydrogen and the methyl radical, x is an integer of from 1 to 3 inclusive, p is an integer of from 0 to 2 inclusive, m is an integer of from 0 to 1 inclusive, n is an integer of from 0 to 1 inclusive and is 1 only when m is 1, and y is an integer of at least 2, and (2) units of the formula $$H_sR''_tSiO_{\frac{4-s-t}{2}}$$

where each R'' is selected from the group consisting of monovalent hydrocarbon and halogenated monovalent hydrocarbon radicals, t is an integer of from 1 to 3 inclusive, s is from 0 to 1 inclusive, and s+t is 1 to 3 inclusive.

References Cited in the file of this patent

Seyferth et al.: Journal of Org. Chem., vol. 20, pp. 250–256 (1956). (Copy in Sci. Libr.)

Papetti et al.: J. of Org. Chem., vol. 22, pp. 526–528 (1957). (Copy in Sci. Libr.)

UNITED STATES PATENT OFFICE
CERTIFICATE OF CORRECTION

January 5, 1960

Patent No. 2,920,060

Robert L. Merker

It is hereby certified that error appears in the printed specification of the above numbered patent requiring correction and that the said Letters Patent should read as corrected below.

Column 4, line 25, for "10 to 10,000" read -- 100 to 10,000 --; column 5, line 3, for "EtOME$_2$Si-" read -- EtOMe$_2$Si- --.

Signed and sealed this 14th day of June 1960.

(SEAL)
Attest:

KARL H. AXLINE
Attesting Officer

ROBERT C. WATSON
Commissioner of Patents